US011817729B2

(12) United States Patent
Sagoo

(10) Patent No.: US 11,817,729 B2
(45) Date of Patent: Nov. 14, 2023

(54) DOCKING STATION WITH DETACHABLE BACK SUPPORT

(71) Applicant: BSH Hausgeraete GmbH, Munich (DE)

(72) Inventor: Kiran Pal Sagoo, Fuerstenfeldbruck (DE)

(73) Assignee: BSH Hausgeraete GmbH, Munich (DE)

( * ) Notice: Subject to any disclaimer, the term of this patent is extended or adjusted under 35 U.S.C. 154(b) by 197 days.

(21) Appl. No.: 17/398,064

(22) Filed: Aug. 10, 2021

(65) Prior Publication Data

US 2022/0045528 A1 Feb. 10, 2022

(30) Foreign Application Priority Data

Aug. 10, 2020 (EP) .................................. 20190234

(51) Int. Cl.
| | |
|---|---|
| *H01M 10/46* | (2006.01) |
| *H02J 7/00* | (2006.01) |
| *H02J 50/10* | (2016.01) |
| *H02J 7/02* | (2016.01) |

(52) U.S. Cl.
CPC .......... *H02J 7/0044* (2013.01); *H02J 7/0047* (2013.01); *H02J 7/02* (2013.01); *H02J 50/10* (2016.02)

(58) Field of Classification Search
CPC ...... H02J 7/0042; H02J 7/0044; H02J 7/0047; H02J 7/02; H02J 50/10; H02J 50/005; G06F 1/1632; H04B 1/3877
USPC ......... 320/103, 107, 108, 110, 114, 115, 148
See application file for complete search history.

(56) References Cited

U.S. PATENT DOCUMENTS

| | | | | |
|---|---|---|---|---|
| 2005/0255895 | A1* | 11/2005 | Lee ........................ | H02J 7/0044 455/575.1 |
| 2007/0101039 | A1* | 5/2007 | Rutledge ............... | G06F 1/1632 710/303 |

FOREIGN PATENT DOCUMENTS

EP 2629172 A2 * 8/2013 ............ H02J 7/0044

* cited by examiner

*Primary Examiner* — Edward Tso
(74) *Attorney, Agent, or Firm* — Laurence A. Greenberg; Werner H. Stemer; Ralph E. Locher

(57) ABSTRACT

A docking station for a handheld electronic device contains a main body, and one or more feet extending downwards from the main body and enabling the main body to be placed on the ground. Furthermore, the docking station contains a detachable back support extending upwards from the main body and enabling an electronic device to be placed into the docking station.

19 Claims, 8 Drawing Sheets

DOCKING STATION WITH DETACHABLE BACK SUPPORT

CROSS-REFERENCE TO RELATED APPLICATION

This application claims the priority, under 35 U.S.C. § 119, of European patent application EP20190234.3, filed Aug. 10, 2020; the prior application is herewith incorporated by reference in its entirety.

BACKGROUND OF THE INVENTION

Field of the Invention

The present document relates to a docking station which may be used within a household, notably within a kitchen, e.g. to provide support for cooking.

A docking station may be used within a household, notably within a kitchen, to provide support for a household task, such as cooking, to a user of the docking station. The user may place an electronic device such as a tablet PC onto a support of the docking station, and the docking station may be used for rending music which is provided by the tablet PC.

BRIEF SUMMARY OF THE INVENTION

The present document addresses the technical problem of increasing the comfort of use and/or reducing the cost of a docking station. The technical problem is solved by each one of the independent claims. Preferred examples are described in the dependent claims.

According to an aspect, a docking station for an electronic device is described. The electronic device may be a handheld electronic device such as a tablet PC or a smartphone. The docking station may be configured to be placed on a table or a worktop within a kitchen. Furthermore, the docking station may be configured to hold a DIN A4 or DIN A5 sized sheet or a typical tablet PC (e.g. with a display size of 12 inches or less).

The docking station may e.g. be configured to communicate with an electronic device which is placed into the docking station, notably for rendering an audio signal provided by the electronic device. The audio signal may be rendered using a loudspeaker of the docking station.

The docking station contains a main body, wherein the main body may exhibit a (circular) cylindrical form. The main body may exhibit a longitudinal axis which may be oriented in parallel to the ground (e.g. the worktop) onto which the docking station is placed. The main body may e.g. have a diameter between 4 cm and 15 cm. Furthermore, the main body may e.g. have a length along the longitudinal axis between 10 cm and 25 cm.

In addition, the docking station contains one or more feet extending downwards from the main body and enabling the main body to be placed on a ground (e.g. a worktop). The one or more feet may extend along the longitudinal axis of the main body (e.g. from one end to the other end of the main body). The docking station may exhibit a front foot (facing the user of the docking station, when the user is using the docking station). Alternatively, or in addition, the docking station may exhibit a rear foot (at the rear side of the docking station). By providing one or more feet, the docking station may be placed on a ground in a stable manner.

In addition, the docking station contain a detachable back support extending upwards from the main body and enabling an electronic device to be placed into the docking station. The back support may exhibit an angle between 45° and 75° relative to the ground that the docking station is standing on. The back support may form a flat backplane which is at least partially in contact with the backside of a (flat) electronic device that is placed into the docking station. In other words, the back support may hold an electronic device from the back.

The docking station may be configured such that the back support can be detached from the main body or attached to the main body by a user of the docking station (e.g. using one or two hands). In particular, detaching and/or attaching may be performed without using a tool.

Hence, a docking station is described, which may be partly dismantled and/or rebuilt in a comfortable manner (just using one or more hands of a user). As a result of this, the space, which is taken up by the docking station may be reduced, thereby increasing the comfort of use of the docking station and/or thereby reducing packaging cost of the docking station.

The main body may comprise a slot having dimensions (notably a width and/or a length) which correspond to dimensions (notably a width and/or a length) of the lower edge of the back support (which is facing the main body, when the back support is attached to the main body). The lower edge of the back support may be configured to be placed within the slot of the main body for attaching the back support to the main body. The dimensions of the slot and the dimensions of the lower edge of the back support may be such that the slot and the lower edge of the back support form a positive connection or a form fit, when the lower edge of the back support is placed within the slot. As a result of this, the back support may be held by the main body in a stable manner.

The back support may comprise a first magnetic element at the lower edge of the back support, and the main body may comprise a second magnetic element within the slot. In particular, the back support and the main body may comprise at least two pairs of a first magnetic element and a second magnetic element, thereby providing a secure fixation of the back support within the slot.

The first magnetic element and the second magnetic element may be configured to attract one another, such that the back support is retained within the slot of the main body. For this purpose, the first magnetic element may comprise a permanent magnet, and the second magnetic element may comprise a ferromagnetic material. Alternatively, the first magnetic element may comprise a ferromagnetic material, and the second magnetic element may comprise a magnet. By making use of a magnet, the back support may be attached to the main body in an efficient and secure manner.

The docking station may be configured to move the first magnetic element and the second magnetic element away from one another, notably in reaction to the actuation of a control element (notably a push button) of the docking station. In particular, the docking station may comprise a lever which is configured to move the second magnetic element away from the first magnetic element, when the control element of the docking station is actuated. The lever may be configured such that the lever is actuated by a movement of the control element caused by a user of the docking station, when actuating the control element (e.g. when the user is pushing down the control element, notably the push button).

By increasing the distance between the first magnetic element and the second magnetic element, the magnetic force between the first magnetic element and the second magnetic element is reduced. The magnetic force may be reduced such that the user is enabled to remove the back support from the slot (by pulling at the top edge of the back support using one hand). Hence, an efficient and secure removal of the back support is enabled.

The back support may comprise a charging coil that is configured to perform wireless charging of an electronic device which is placed into the docking station. As a result of this, the comfort of use of the docking station is increased further.

The back support may comprise a power interface, notably a connector, which is configured to be coupled with a power supply within the main body and/or with a power supply external to the docking station. In particular, the detachable back support may be configured to be used independently from the main body as a wireless charging pad, when the back support is detached from the main body. This enables the user to use the back support in multiple different ways, thereby increasing the comfort for the user.

The docking station, notably the main body, may comprise a control unit, wherein the control unit may be configured to determine that an electronic device has been placed into the docking station (e.g. using a sensor of the docking station). The control unit may be configured, in reaction to detecting an electronic device, to (automatically) initiate a wireless charging event of the electronic device. Alternatively, or in addition, the control unit may be configured to determine information regarding the charging status (notably the state-of-charge) of the electronic device and to indicate the information via a user interface (e.g. via a light emitting diode) of the docking station. As a result of this, the comfort of use of the docking station is increased further.

The docking station, notably the back support, may comprise an attaching section, which is configured to attract an exchangeable label, notably using a magnetic force. For this purpose, the attaching section may comprise magnetic paint. Alternatively, or in addition, the docking station, notably the back support, may comprise a light emitting section which is configured to emit light in a modifiable color. In this context, the main body may comprise a multi-color light source (notably a LED) which is configured to emit light in a modifiable color. Furthermore, the docking station may comprise a light guide configured to guide light from the light source to the light emitting section. Hence, a docking station may be provided which can be adapted to different designs and/or brandings in an efficient manner.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

Other features which are considered as characteristic for the invention are set forth in the appended claims.

Although the invention is illustrated and described herein as embodied in a docking station with a detachable back support, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1A:
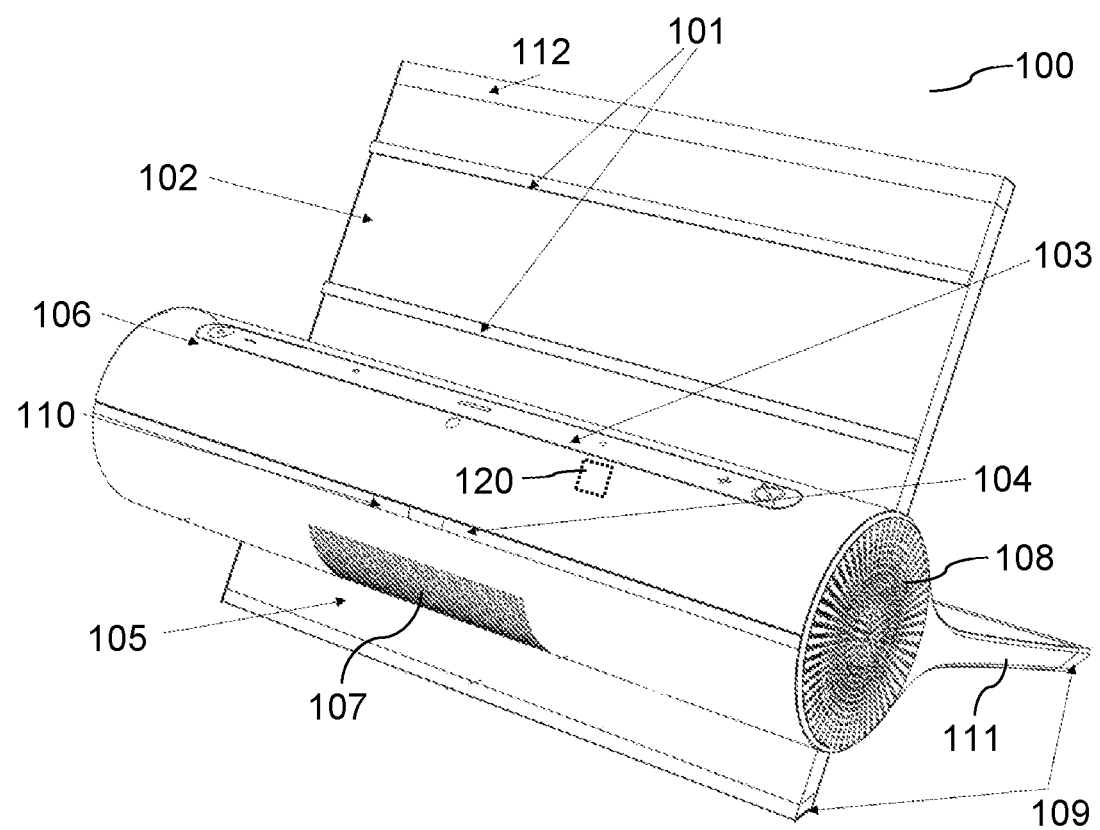
FIG. 1A is a diagrammatic, perspective view of an example docking station according to the invention.

As outlined above, the present document is directed at increasing the comfort of use of a docking station. Referring now to the figures of the drawings in detail and first, particularly to FIG. 1A thereof, there is shown an example docking station 100. The docking station 100 contains a main chamber or main body 106, which may have a cylindrical form as illustrated in FIG. 1A. The main chamber 106 may comprise one or more electronic components such as a control unit 120, e.g. a microcontroller, of the docking station 100. Furthermore, the main chamber 106 may comprise a control panel 103 with one or more control elements, notably control buttons. The control panel 103 may enable a user to interact with the docking station 100.

Alternatively, or in addition to a control panel 103, the docking station 100 may contain a gesture sensor 104 (located e.g. on the main chamber 106), which is configured to sense gesture data regarding a (hand) gesture performed by a user of the docking station 100. The docking station 100 may then be controlled in dependence of the gesture data. In addition, the docking station 100 may contain one or more light elements 110, notably light emitting diodes (LED), e.g. for providing status information regarding the status of the docking station 100 to a user of the docking station 100.

The main chamber 106 may further contain one or more loudspeakers 108 which are configured to emit an audio signal. The one or more loudspeakers 108 may be located at a face side of the (cylindrical) main chamber 106. The main chamber 106 may act as an acoustic chamber for improving the sound quality of the one or more loudspeakers 108. In addition, the docking station 100 may comprise a (passive) acoustic radiator 107 on the (cylindrical) surface of the main chamber 106, preferably facing the user of the docking station 100.

The docking station 100 may comprise one or more base feet 105, 111, notably a base foot 105 at a front side facing the user and/or a rear foot 111 at a rear side of the docking station 100. The one or more base feet 105, 111 may be attached to the main chamber 106, and may extend from the main chamber 106 towards the ground, on which the docking station 100 is placed. The one or more base feet 105, 111 may extend along the longitudinal axis of the (cylindrical) main chamber 106.

The one or more base feet 105, 111 may each comprise an isolator element 109, e.g. comprising silicone, at the end which is in contact with the ground that the docking station 100 is placed on. The use of an isolator element 109 allows the docking station 100 to be placed in a stable manner. Furthermore, the docking station 100 may be isolated against vibrations.

In addition, the docking station 100 comprises a back support 102 which extends from the main chamber 106 upwards (i.e. away from the ground that the docking station 100 is placed on). The back support 102 may exhibit an angle with regards to the ground between 45° and 75°, when the docking station 100 is placed on the ground. The back support 102 may be configured as a support for a typical tablet PC (e.g. with a screen size between 8 inch and 13 inch). The back support 102 may extend along the longitudinal axis of the main chamber 106 (from one end to the other end of the main chamber 106).

The back support 102 may exhibit one or more isolator stripes 101 which may extend horizontally across the back support 102. Furthermore, the back support 102 may have an isolator section 112 at the top end of the back support 102. The use of isolator stripes 101 and/or of an isolator section 112 allows an object, such as a tablet PC, to be placed onto the back support 102 in a stable manner. Furthermore, isolation of vibrations may be provided.

Figure 1B:
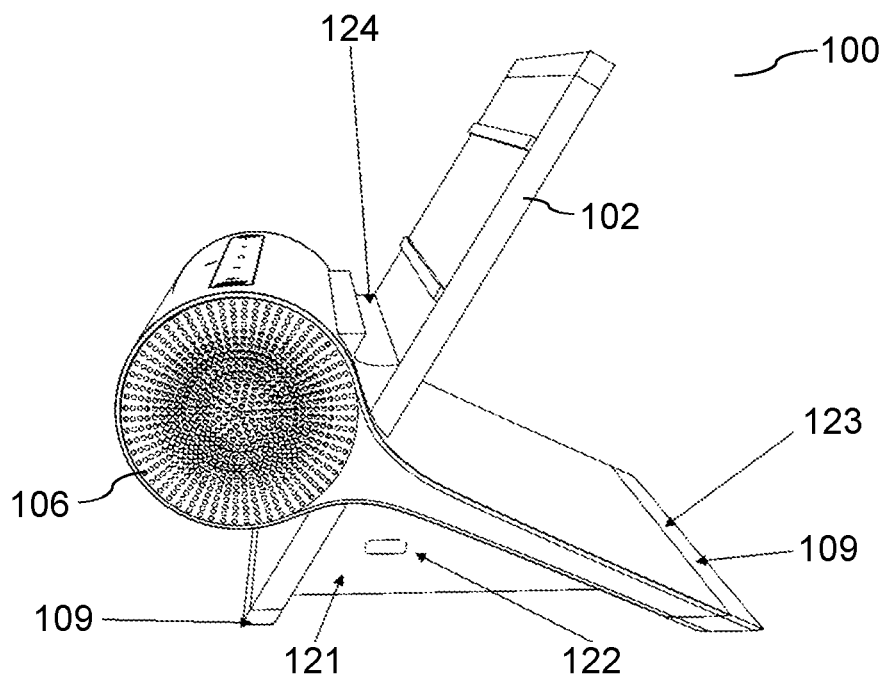
FIG. 1B is a perspective view of the example docking station in a side view.

In addition, the docking station 100 may contain a base support 124, as shown in FIG. 1B, which is located at the contact point between the main chamber 106 and the back support 102. The base support 124 may form a gap within which the lower edge of an electronic device, notably of a tablet PC, may be placed, in order to hold the electronic device in a stable manner on the back support 102. The base support 124 may contain an isolating material, in order to allow vibrations of the docking station 100 (e.g. due to rending of an audio signal via a loudspeaker 108 of the docking station 100) to be isolated.

FIG. 1B shows a side view of the docking station 100. The docking station 100 may contain a housing 121 for one or more electronic components (e.g. for the control unit 120). The housing 121 may be located between the front foot 105 and the rear foot 111 of the docking station 100. The housing 121 may be part of the main body 106 of the docking station 100. Furthermore, the docking station 100 may contain a data and/or power interface 122 (e.g. a USB-C interface) for data communication and/or for power supply. In addition, the docking station 100 may contain a section 123 for placing a power cord for a power supply of the docking station 100.

The docking station 100 shown in FIGS. 1A and 1B exhibits a relatively large size, and requires a relatively large packaging. This increases the cost of the docking station 100 (notably for logistics) and reduces the comfort of use for a user of the docking station 100. FIGS. 2A to 2D illustrate a docking station 100 which contains the detachable back support 102. The docking station 100, notably the main body 106 of the docking station 100, contains a slot 210 which is configured to receive (the lower edge of) a detachable back support 102. In particular, the lower edge of the back support 102 may be inserted into the slot 210 of the docking station 100.

The lower edge of the back support 102 exhibits a certain width (e.g. between 4 mm and 10 mm) and/or a certain length (e.g. between 10 cm and 30 cm), and the slot 210 may exhibit corresponding dimensions, in order to allow the lower edge of the back support 102 to be inserted into the slot 210. The back support 102 and the slot 210 may be configured to form a frictional connection and/or a form-fit.

The back support 102 may comprise one or more first magnetic elements 201, notably at the lower edge of the back support 102. Furthermore, the main body 106 of the docking station 100 may comprise one or more second magnetic elements 211, notably within the slot 210. The one or more first magnetic elements 201 and the one or more second magnetic elements 211 are configured to exert an attracting magnetic force onto one another. In particular, the magnetic elements 201, 211 may be such that the back support 102 is held within the slot 210 by a magnetic force between corresponding magnetic elements 201, 211. As a result of this, a reliable connection between the main body 106 and the detachable back support 102 of the docking station 100 may be provided.

A first magnetic element 201 may be arranged directly in front of a corresponding second magnetic element 211, when the back support 102 is positioned within the slot 210. By doing this, a relatively strong magnetic force may be achieved, even when using a relatively small magnet. In a preferred example, the first magnetic element 201 contains a magnet and the second magnetic element 211 contains a (ferromagnetic) metal. In an alternative example, the first magnetic element 201 contains a (ferromagnetic) metal and the second magnetic element 211 contains a (permanent) magnet.

Figure 2A:
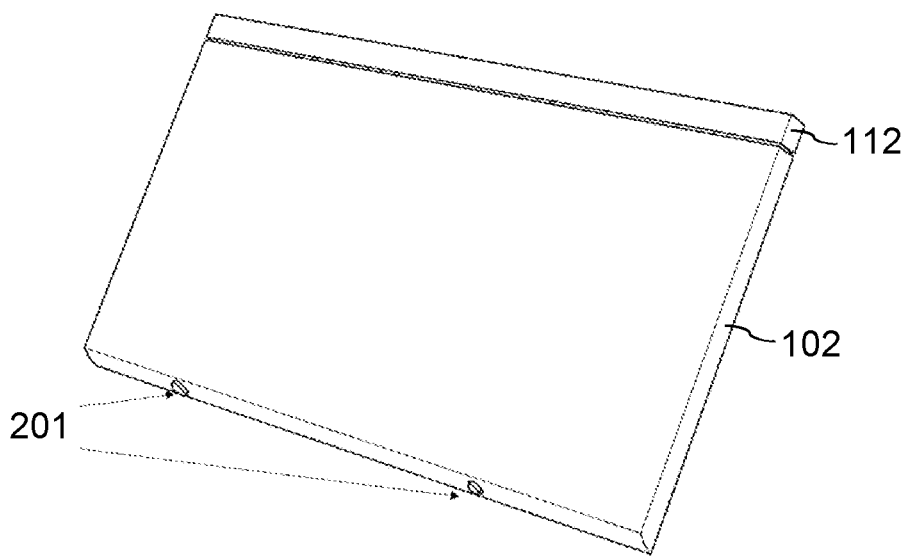
FIG. 2A is a perspective view of a detachable back support.
Figure 2B:
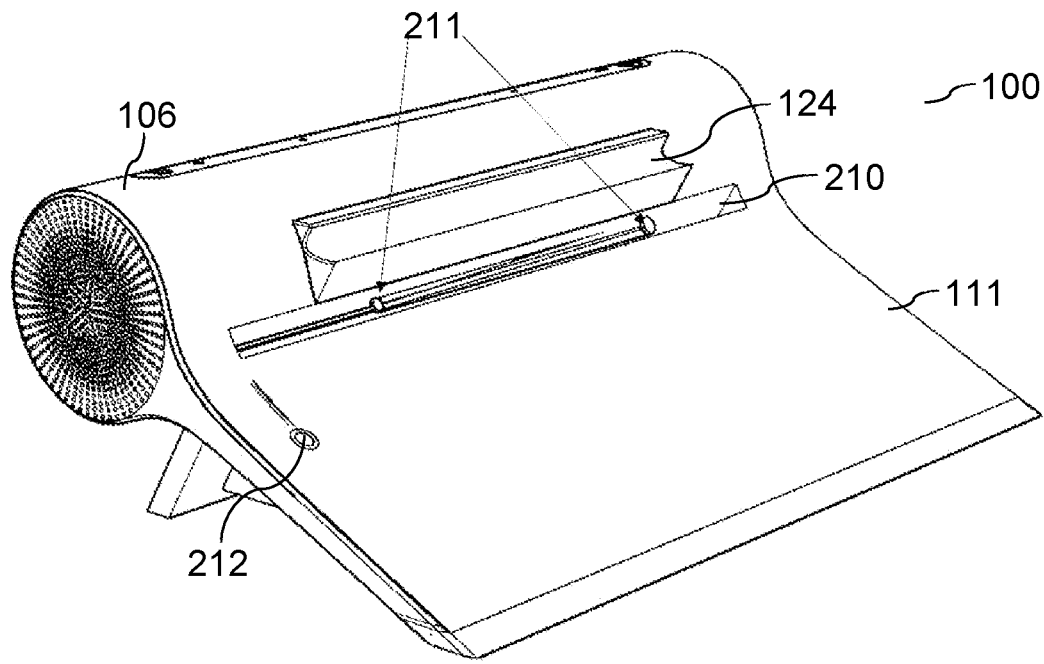
FIG. 2B is a perspective view of the main body of the docking station containing a slot for a detachable back support.
Figure 2C:
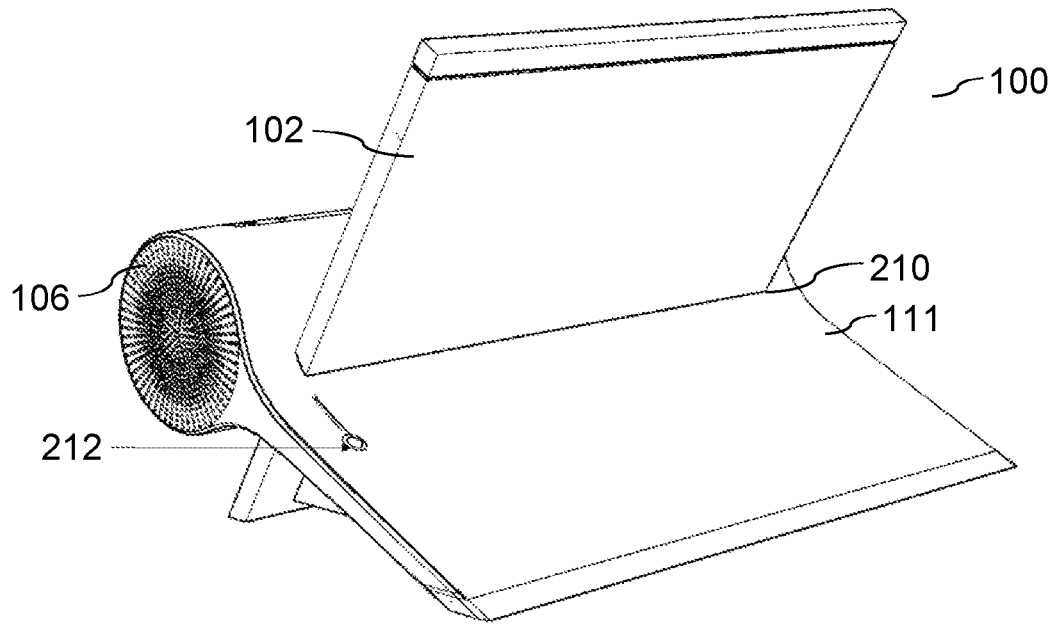
FIG. 2C is a perspective view of the docking station with the detachable back support.
Figure 2D:
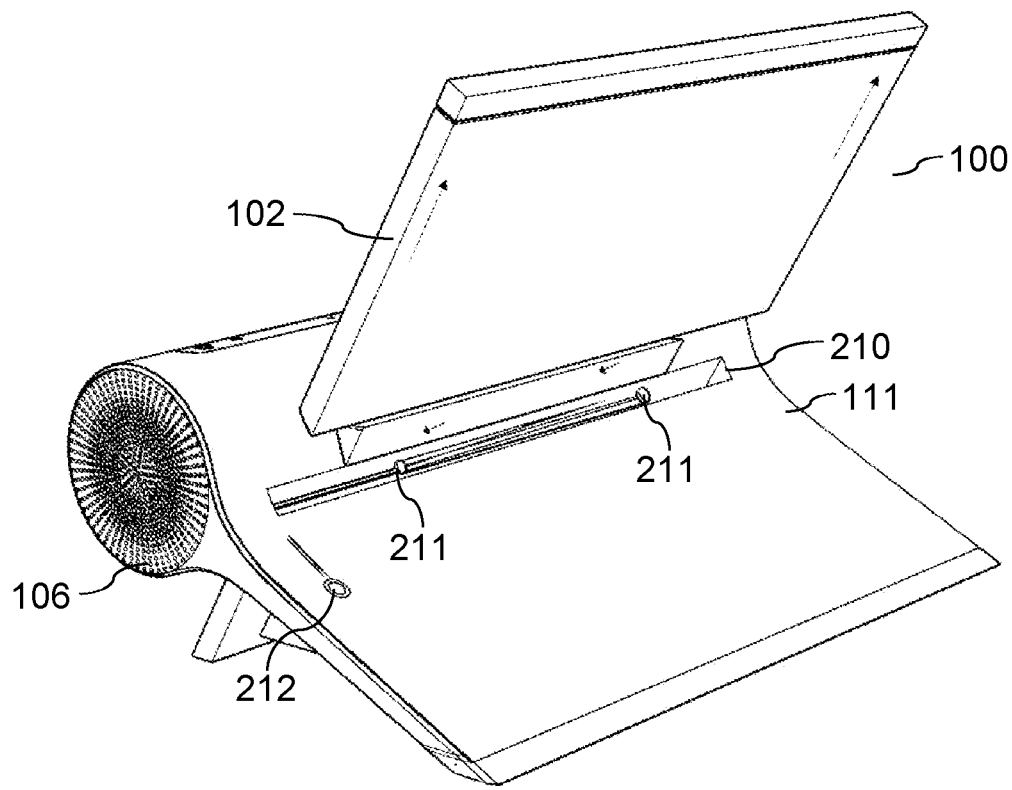
FIG. 2D is a perspective view of the mechanism for detaching the back support.

The docking station 100 may comprise a control element 212, e.g. a push button, which is configured to release or to weaken the magnetic connection between the one or more corresponding magnetic elements 201, 211. This may be achieved mechanically, by moving the one or more second magnetic elements 211 away from the one or more corresponding first magnetic elements 201 (as illustrated in FIG. 2D). In particular, the control element 212 may cause the one or more second magnetic elements 211 to move along the longitudinal axis of the main body 106, as shown in FIG. 2D by the arrows at one edge of the slot 210. By way of example, by pushing down the control element 212 a mechanical mechanism (notably a lever) may be actuated, which causes the one or more second magnetic elements 211 to move away from the one or more corresponding first magnetic elements 201. This reduces the magnetic force between the corresponding magnetic elements 201, 211 and allows the user to detach the back support 102 in a comfortable manner (as illustrated by the upward oriented arrows in FIG. 2d), e.g. by pulling the back support 102 with one hand.

Hence, a docking station 100 is described, which allows a user to attach and detach the back support 102 whenever needed. The docking station 100 may be packaged and shipped to the user with the back support 102 being separated from the main body 106 of the docking station 100. The user may then attach the back support 102 manually before placing a tablet PC or smartphone onto the docking station 100. The user may be guided to place the back support 102 securely onto the main body 106 and/or to remove the back support 102 in a comfortable manner. The back support 102 may comprise two magnetic elements 201 and the main body 106 may comprise two corresponding magnet elements 211. A pair of corresponding magnetic elements 201, 211 may exhibit opposite (magnetic) polarity to attach the back support 102 to the main body 106.

The two second magnet elements 211 on the main body 106 may be placed on a mechanical lever. The main body 106 may comprise a push button 212, e.g. on the back side of the main body 106, which moves the second magnetic elements 211 to reduce the magnetic force between the pairs of magnetic elements 201, 211, thereby allowing the user to remove the back support 102 in a safe and comfortable manner.

The construction of the docking station 100 may thus comprise a detachable back support 102 with two magnetic elements 201 at the bottom of the back support 102. The body 106 of the docking station 100 may comprise corresponding magnetic elements 211 with opposite polarity to attach the back support 102. The magnetic elements 211 may be placed on a lever connected to a push button 212 on the main body 106.

When the user wants to attach the back support 102 to the main body 106, the pairs of magnetic elements 201, 211 allow the back support 102 to be attached in a comfortable and firm manner. When the user wants to detach the back support 102, the user pushes the mechanical button 212, e.g. on the back incline of the main body 106, and as a result of this, the back support 102 is set loose from the magnetic elements 211 inside the slot 210 of the main body 106. The user may then remove the back support 102 in a comfortable manner.

By pushing the button 212, the user makes a conscious choice to remove the back support 102. As a result of this, an unintentional removal of the back support 102 may be avoided in a reliable manner, thereby preventing a possible damage to an electronic device which is placed onto the back support 102.

The mechanism for detaching the back support 102, which is described herein, may be implemented in a cost-efficient manner.

Figure 3A:
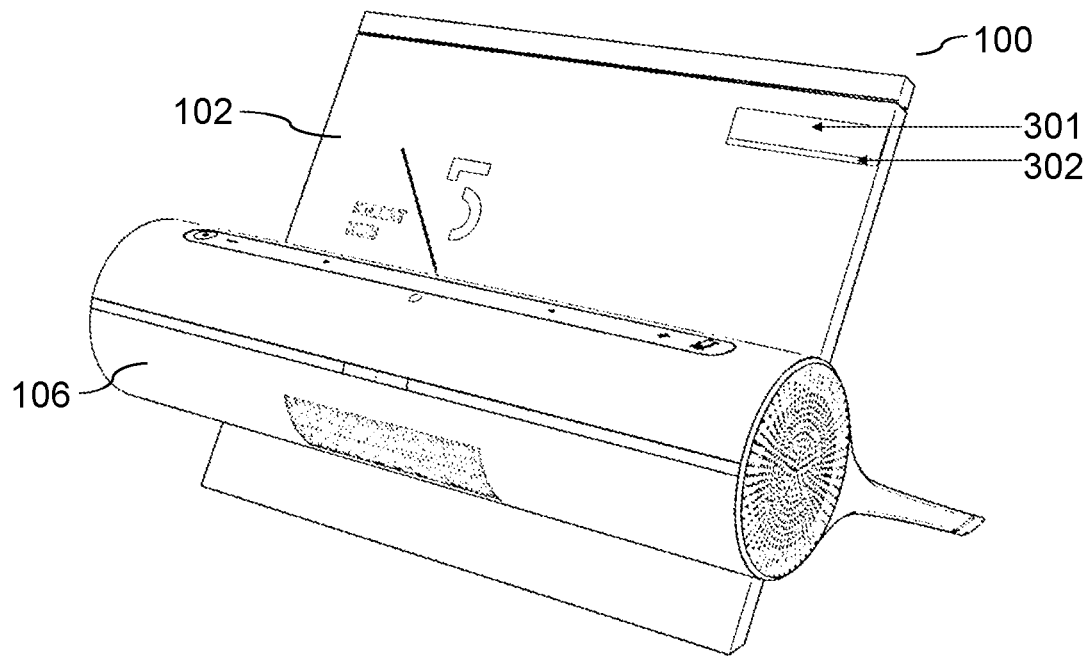
FIG. 3A is a perspective view of a customizable docking station.
Figure 3B:
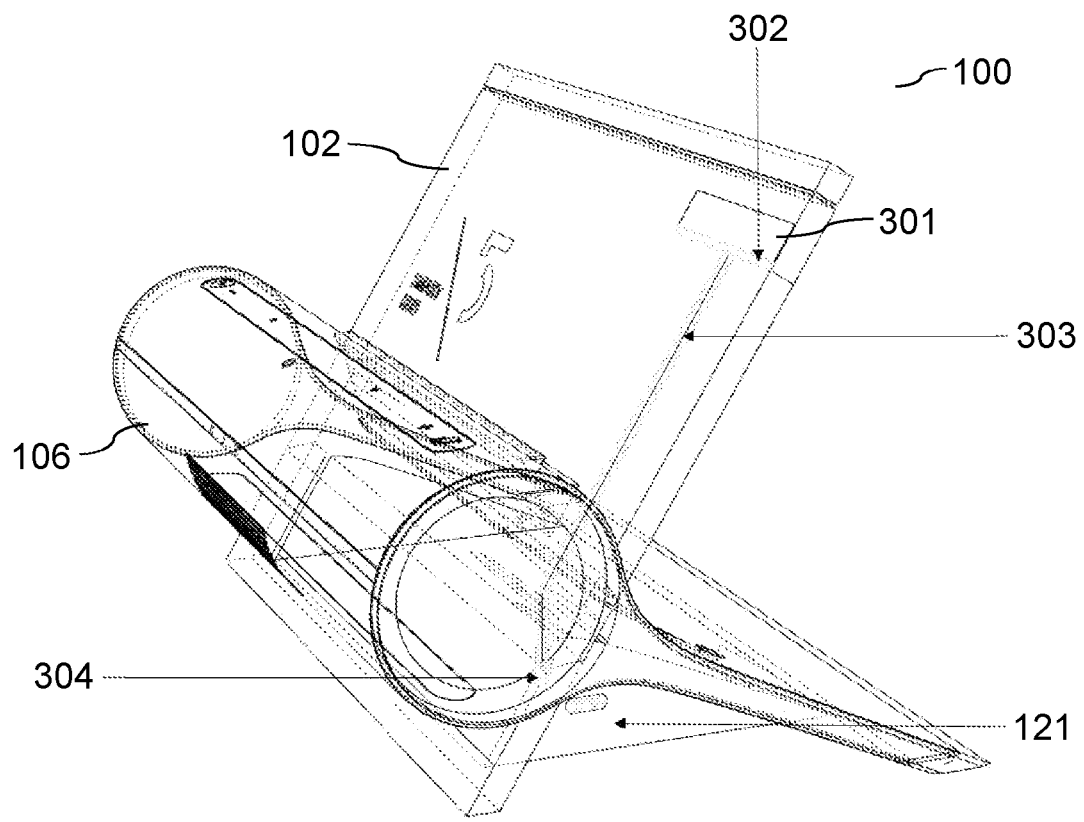
FIG. 3B is a perspective view of the docking station containing a light guide.
Figure 3C:
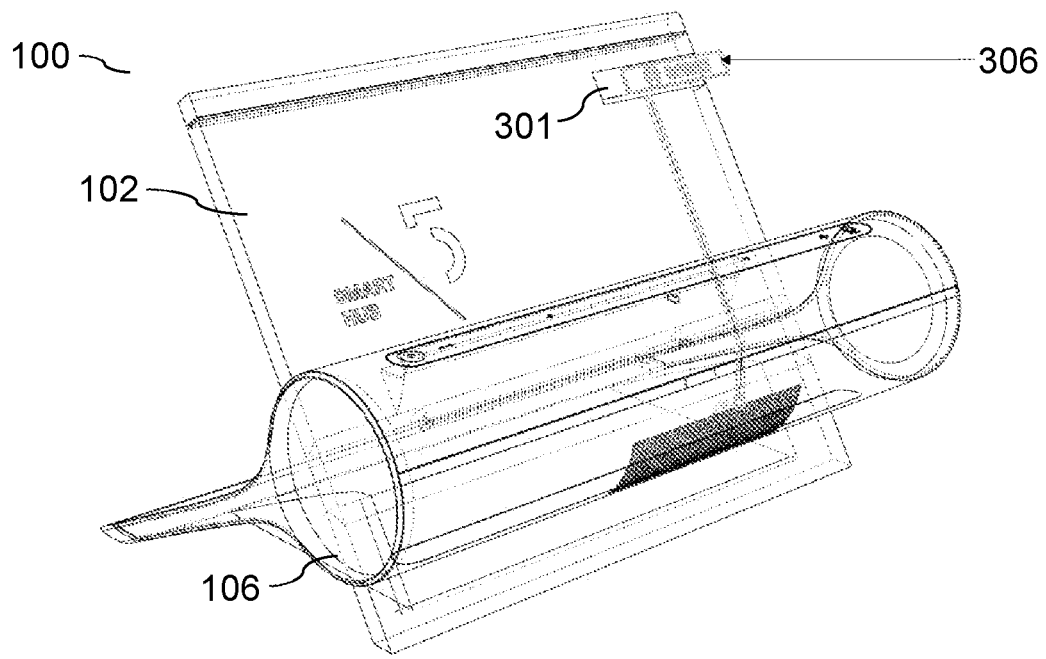
FIG. 3C is a perspective view of the docking station with a customizable logo field.

A docking station 100 may be used in different contexts and/or for different brands. FIGS. 3A to 3C illustrate the docking station 100 which may be adapted in a flexible manner to different contexts and/or for different brands. In other words, a customizable docking station 100 is shown.

The docking station 100 may have an attaching section 301, notably on the back support 102 and/or on the main body 106, which is configured to hold a label 306. The attaching section 301 and the label 306 may be configured to attract one another using a magnetic force. For this purpose, the attaching section 301 may e.g. comprise a magnetic paint and the label 306 may comprise a (ferromagnetic) metal (or vice versa). The label 306 may e.g. comprise or indicate the logo of a particular brand.

Alternatively, or in addition, the docking station 100 may comprise one or more light emitting sections 302, e.g. on the back support 102 and/or on the main body 106. The one or more light emitting sections 302 may be configured to emit light in an adaptable color. This may be achieved using e.g. a RGB (Red, Green, Blue) light emitting diode (LED). In particular, the docking station 100 may comprise a light source 304 (e.g. an RGB LED) which may be located within the main body 106 and/or within the housing 121. The light source 304, notably the color of the light which is emitted by the light source 304, may be set by the control unit 120. The light source 304 may be coupled with the one or more light emitting sections 302 via one or more light guides 303.

Hence, a docking station 100 is described, which may be customized in a flexible and efficient manner, notably to different brands. The docking station 100 may comprise a place or section 301 for attaching a label 306 with the logo of a particular brand. Alternatively, or in addition, a light emitting section 302 may be provided which exhibits the color of a particular brand. The back support 102 of the docking station 100 may comprise a rectangular area 301 (i.e. an attaching section), which is painted with magnetic paint. The use of magnetic paint allows to reduce tooling cost for creating a recess for the brand label 306.

Below the magnetic area 301, an area 302 forming a light line may be provided, wherein the latter area 302 may be configured to change the color depending on the brand. A RGBW (red, green, blue, white) LED 304 may be placed inside the electronic housing 121 of the docking station 100 and a connecting light guide 303 may pass through the back support 102 to illuminate the light emitting area 302.

In other words, the docking station 100, notably the back support 102, may comprise a rectangular area 301 which is painted with magnetic paint. An area 302 below the magnetic paint may be translucent and may comprise a light guide 303 behind it to channel light from the electronic housing 121 of the docking station 100. The light may be emitted by a single RGBW LED 304 in the electronics housing 121, which illuminates the light line 302 under the brand bar area 301. FIG. 3C illustrates how a user may place a brand label 306 on the magnetic area 301 in a comfortable manner. The color of the LED 304 may be changed using software control.

An electronic device may be placed onto the docking station 100, notably onto the back support 102, for a relatively long time. FIGS. 4A to 4E show a docking station 100 which is configured to perform wireless charging of an electronic device 430 which is placed onto the docking station 100. In particular, the docking station 100 may contain a charging coil 401 within the back support 102, wherein the charging coil 401 may be attached to a power supply of the docking station 100, notably to a power supply of the main body 106 of the docking station 100. Wireless charging may be provided using e.g. the Qi standard. The charging coil 401 may be configured to generate a magnetic field which induces a charging current within a corresponding coil of an electronic device 430.

The control unit 120 may be configured to detect that an electronic device 430, notably a tablet PC or a smartphone, has been placed onto the docking station 100. In reaction to this, the control unit 120 may cause the electronic device 430 to be charged using the charging coil 401.

As indicated above, the back support 102 may be detachable. The back support 102 may comprise a data and/or power interface 402 and the main body 106 may comprise a corresponding data and/or power interface 403. The interfaces 402, 403 may form a plug-in connection. An example interface is a USB, notably a USB-C, interface. Hence, when placing the back support 102 into the slot 210 of the main body 106, the interface 402 of the back support 102 may form a plug-in connection with the corresponding interface 403 of the main body 106. The electrical power for charging an electronic device 430 using the charging coil 401 may be provided via the interfaces 402, 403.

Figure 4A:
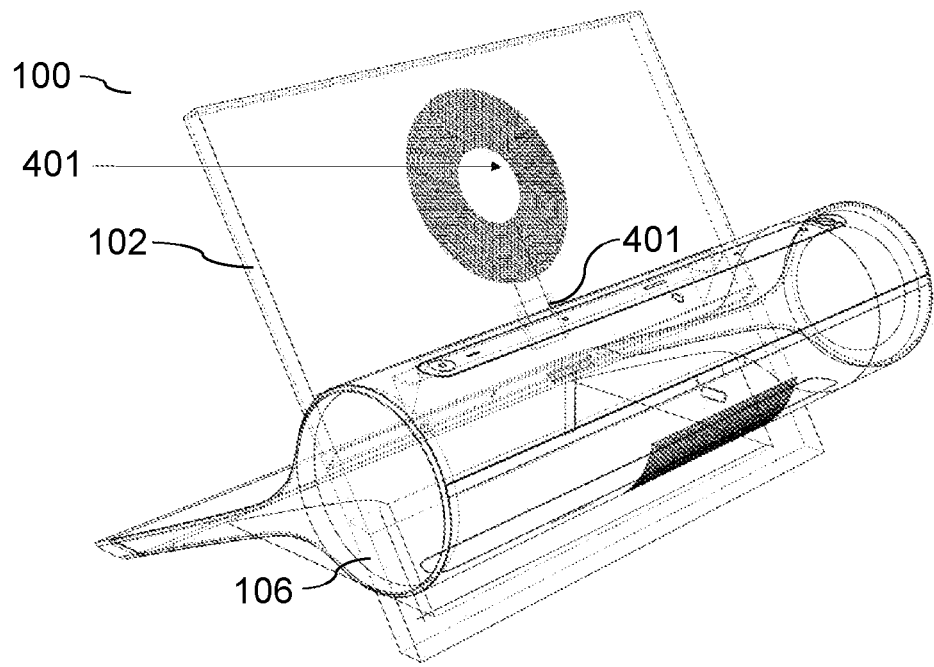
FIGS. 4A to 4E are perspective views of the docking station with a charging coil.
Figure 4B:
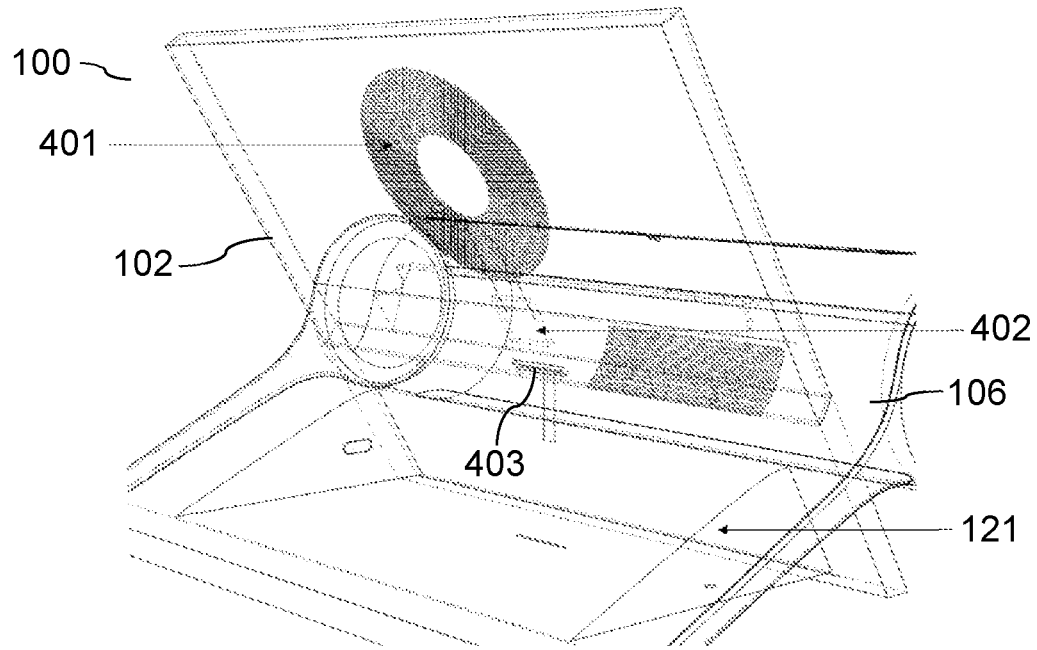
Figure 4C:
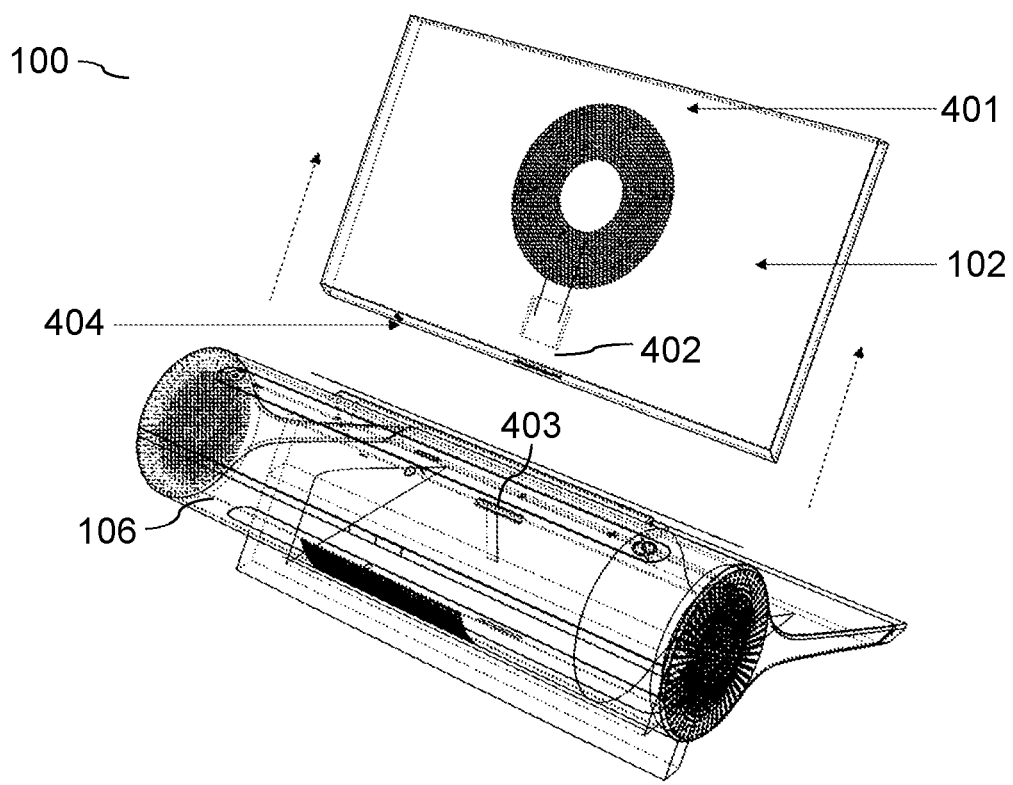
Figure 4D:
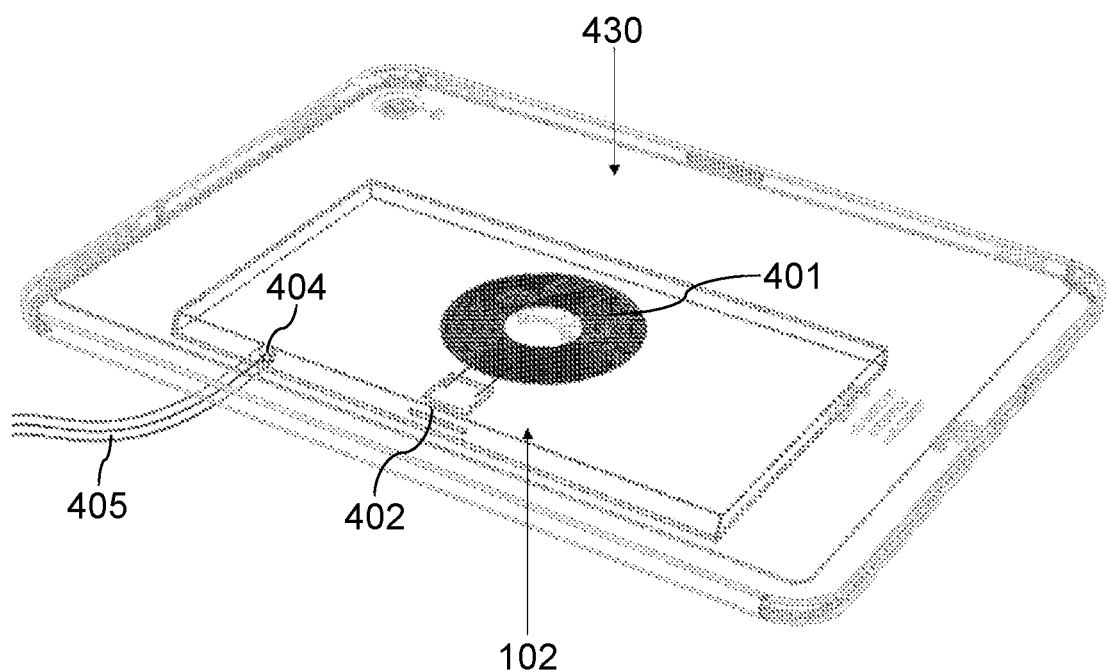
Figure 4E:
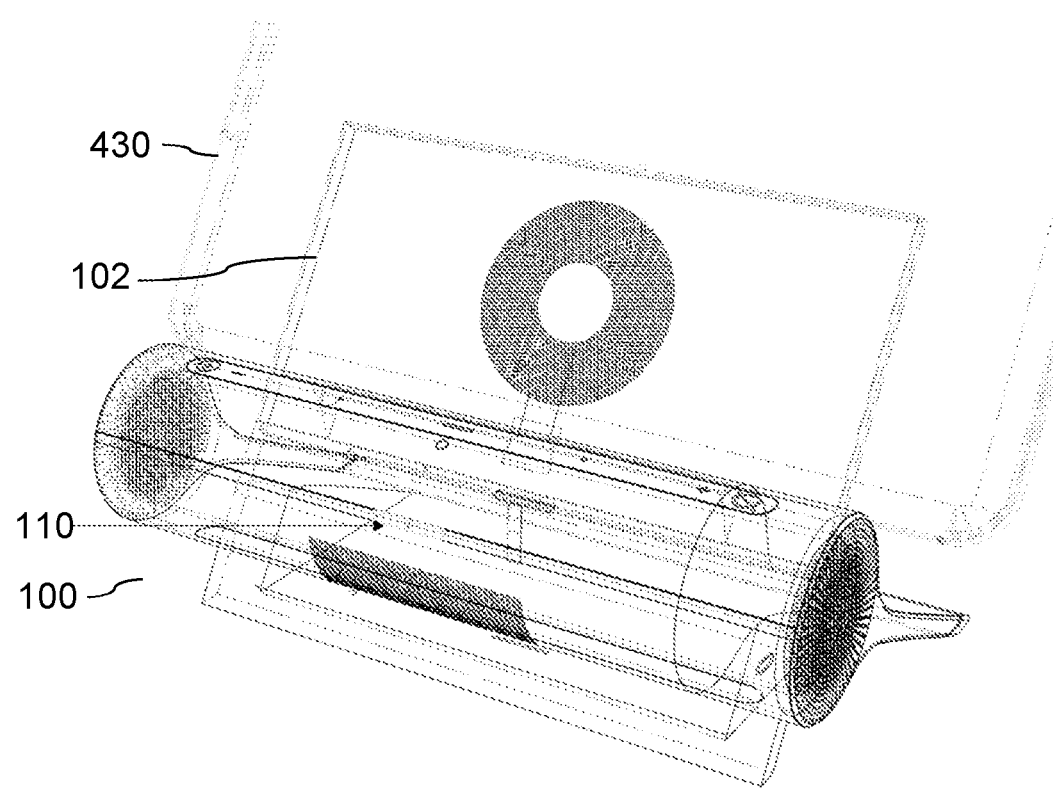

The detachable back support 102 may be configured to be used stand-alone (without the main body 106) as a wireless charging pad for an electronic device 430, as illustrated in FIG. 4D. For this purpose, the data and/or power interface 402 of the back support 102 and/or a separate power interface 404 may be used to connect an external power supply 405 (e.g. a power plug). The back support 102 may then be placed e.g. on a table and an electronic device 430 may be placed onto the back support 102 for charging. The detachable back support 102 may then be used independently from the main body 106 of the docking station 100.

The control unit 120 of the docking station 100 may be configured to determine the charging status, notably the state of charge (SOC), of an electronic device 430. Information regarding the charging status may be indicated on the main body 106 of the docking status 100 using a light element 110. By way of example, the color of the light element 110 and/or a blinking pattern of the light element 110 may indicate the charging status. By indicating the charging status on the docking station 100, the comfort of use of the docking station 100 may be increased further.

Hence, a docking station 100 is described, which is configured to charge a handheld electronic device 430 wirelessly through a coil 401 inside the docking or back support 102. The docking or back support 102 may be detachable, and a power channel inside the back support 102 may allow the back support 102 to be used (separately from the main body 106 and/or from the docking station 100) as a wireless charging pad for an electronic device 430.

In other words, the docking station 100 may comprise a wireless charging coil 401 inside the back support 102. The back support 102 may comprise a connector 402 for connecting the back support 102 to the electronics housing 121 and/or to the main body 106, when the back support 102 is attached to the main body 106. A detachable back support 102 may be removed from the docking station 100 and may be configured to be used as a separate charging pad. For this purpose, the back support 102 may comprise a connector 404 for attaching a power cable 405 to the back support.

The docking station 100 may comprise a front LED 110 which is configured to indicate the charging status of the electronic device 430 which is placed onto the back support 102. The color green may indicate fully charged, the color orange may indicate 30~80% charged and/or the color red may indicate less than 10% charged.

By providing a docking station 100 which comprises a wireless charging coil 401, the comfort of use of the docking station 100 may be increased further. In particular, a user may be provided with the possibility to use and to charge an electronic device 430 simultaneously. By integrating the charging coil 401 into a detachable back support 102, an independent charging pad may be provided in an efficient manner. Charging may be provided independently from a docking status between the docking station 100 and the electronic device 430 which is placed onto the docking station 100.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

The invention claimed is:

1. A docking station for a handheld electronic device, the docking station comprising:
    a main body;
    at least one foot extending downwards from said main body and enabling said main body to be placed on a ground; and
    a detachable back support extending upwards from said main body and enabling the handheld electronic device to be placed into the docking station, said detachable back support containing a charging coil configured to perform wireless charging of the handheld electronic device which is placed into the docking station.

2. The docking station according to claim 1, wherein:
    said main body having a slot formed therein with dimensions corresponding to dimensions of a lower edge of said detachable back support; and
    said lower edge of said detachable back support is configured to be placed within said slot of said main body for attaching said detachable back support to said main body.

3. The docking station according to claim 2, wherein the dimensions of said slot and the dimensions of said lower edge of said back support are such that said slot and said lower edge of said detachable back support exhibit a form fit, when said lower edge of said detachable back support is placed within said slot.

4. The docking station according to claim 2, wherein:
    said detachable back support has a first magnetic element at said lower edge of the detachable back support;
    said main body has a second magnetic element within said slot; and
    said first magnetic element and said second magnetic element are configured to attract one another, such that said detachable back support is retained within said slot of said main body.

5. The docking station according to claim 4, wherein:
    said first magnetic element has a permanent magnet, and said second magnetic element contains a ferromagnetic material; or
    said first magnetic element contains a ferromagnetic material and said second magnetic element contains a magnet.

6. The docking station according to claim 4, further comprising a control element, the docking station being configured to move said first magnetic element and said second magnetic element away from one another, in reaction to actuation of said control element, to reduce a magnetic force between said first magnetic element and said second magnetic element, and to allow a user to remove said detachable back support from said slot.

7. The docking station according to claim 6, further comprising a lever configured to move said second magnetic element away from said first magnetic element, when said control element of the docking station is actuated, and said lever is actuated by a movement of said control element caused by a user of the docking station, when actuating said control element.

8. The docking station according to claim 1, wherein said detachable back support has a power interface configured to be coupled with a power supply within said main body and/or with a power supply external to the docking station.

9. The docking station according to claim 1, wherein said detachable back support configured to be used independently from said main body as a wireless charging pad, when said detachable back support is detached from said main body.

10. The docking station according to claim 1, further comprising:
    a user interface; and
    a controller configured to:

determine that the handheld electronic device has been placed into the docking station; and in reaction to placement of the handheld electronic device in the docking station, initiate a wireless charging event of the handheld electronic device; and/or in reaction to placement of the handheld electronic device in the docking station, determine information regarding a charging status of the handheld electronic device and indicate the information via said user interface of the docking station.

11. The docking station according to claim 1, further comprising an attaching section configured to attract an exchangeable label.

12. The docking station according to claim 1, further comprising a light emitting section configured to emit light in a modifiable color.

13. The docking station according to claim 12,
wherein said main body contains a multi-color light source which is configured to emit light; and
further comprising a light guide configured to guide light from said multi-color light source to said light emitting section.

14. The docking station according to claim 1, wherein the docking station is configured to communicate with the handheld electronic device which is placed into the docking station, for rendering an audio signal provided by the handheld electronic device using a loudspeaker of the docking station.

15. The docking station according to claim 4, wherein the docking station is configured to move said first magnetic element and said second magnetic element away from one another to reduce a magnetic force between said first magnetic element and said second magnetic element, and to allow a user to remove said detachable back support from said slot.

16. The docking station according to claim 10, wherein said main body contains said controller.

17. The docking station according to claim 1, wherein said detachable back support has an attaching section, which is configured to attract an exchangeable label using a magnetic force.

18. The docking station according to claim 1, wherein said detachable back support has a light emitting section configured to emit light in a modifiable color.

19. The docking station according to claim 8, wherein said power interface is a connector.

* * * * *